US010694518B2

(12) United States Patent
Cariou et al.

(10) Patent No.: US 10,694,518 B2
(45) Date of Patent: Jun. 23, 2020

(54) ENHANCED CHANNEL ACCESS FOR WIRELESS COMMUNICATIONS

(71) Applicant: Intel Corporation, Santa Clara, CA (US)

(72) Inventors: Laurent Cariou, Portland, OR (US); Yaron Alpert, Hod Hasharon (IL); Roni Abiri, Raanana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/120,085

(22) Filed: Aug. 31, 2018

(65) Prior Publication Data

US 2019/0075562 A1   Mar. 7, 2019

Related U.S. Application Data

(60) Provisional application No. 62/553,560, filed on Sep. 1, 2017.

(51) Int. Cl.
| | |
|---|---|
| *H04W 72/04* | (2009.01) |
| *H04W 74/00* | (2009.01) |
| *H04W 74/08* | (2009.01) |
| *H04W 88/02* | (2009.01) |
| *H04W 84/12* | (2009.01) |

(52) U.S. Cl.
CPC ..... *H04W 72/0446* (2013.01); *H04W 74/002* (2013.01); *H04W 74/0816* (2013.01); *H04W 84/12* (2013.01); *H04W 88/02* (2013.01)

(58) Field of Classification Search
CPC ......... H04W 72/0446; H04W 74/0816; H04W 74/002; H04W 84/12; H04W 88/02
See application file for complete search history.

(56) References Cited

U.S. PATENT DOCUMENTS

| | | | |
|---|---|---|---|
| 2006/0268746 A1* | 11/2006 | Wijting | H04W 48/00 370/254 |
| 2009/0279514 A1* | 11/2009 | Seok | H04W 74/0816 370/336 |
| 2010/0046454 A1* | 2/2010 | Wentink | H04W 74/0816 370/329 |
| 2016/0066208 A1* | 3/2016 | Baron | H04W 74/085 370/230 |
| 2017/0055287 A1* | 2/2017 | Yang | H04W 72/04 |
| 2017/0208626 A1* | 7/2017 | Li | H04W 74/08 |
| 2018/0295627 A1* | 10/2018 | Li | H04W 28/065 |

* cited by examiner

*Primary Examiner* — Dady Chery
(74) *Attorney, Agent, or Firm* — Eversheds Sutherland (US) LLP

(57) ABSTRACT

This disclosure describes systems, methods, and devices related to enhanced channel access for wireless communications. A device may determine a first transmission opportunity (TXOP) for a first time period, wherein the first time period is allocated to the device for transmission of one or more frames to a first device on a channel. The device may determine an extended TXOP for a second time period, wherein the extended TXOP is allocated to the device after a time gap from the first TXOP. The device may perform an enhanced distributed channel access (EDCA) operation before accessing the channel. The device may cause to send a first frame of the one or more frames on the channel during the first TXOP.

20 Claims, 7 Drawing Sheets

ENHANCED CHANNEL ACCESS FOR WIRELESS COMMUNICATIONS

CROSS-REFERENCE TO RELATED APPLICATION(S)

This application claims the benefit of U.S. Provisional Application No. 62/553,560, filed Sep. 1, 2017, the disclosure of which is incorporated herein by reference as if set forth in full.

TECHNICAL FIELD

This disclosure generally relates to systems and methods for wireless communications and, more particularly, to enhanced channel access for wireless communications.

BACKGROUND

Communication devices in wireless systems are becoming widely prevalent and are increasingly requesting services from other communication devices. One of these services is the ability to perform channel access procedures.

DETAILED DESCRIPTION

Figure 1:
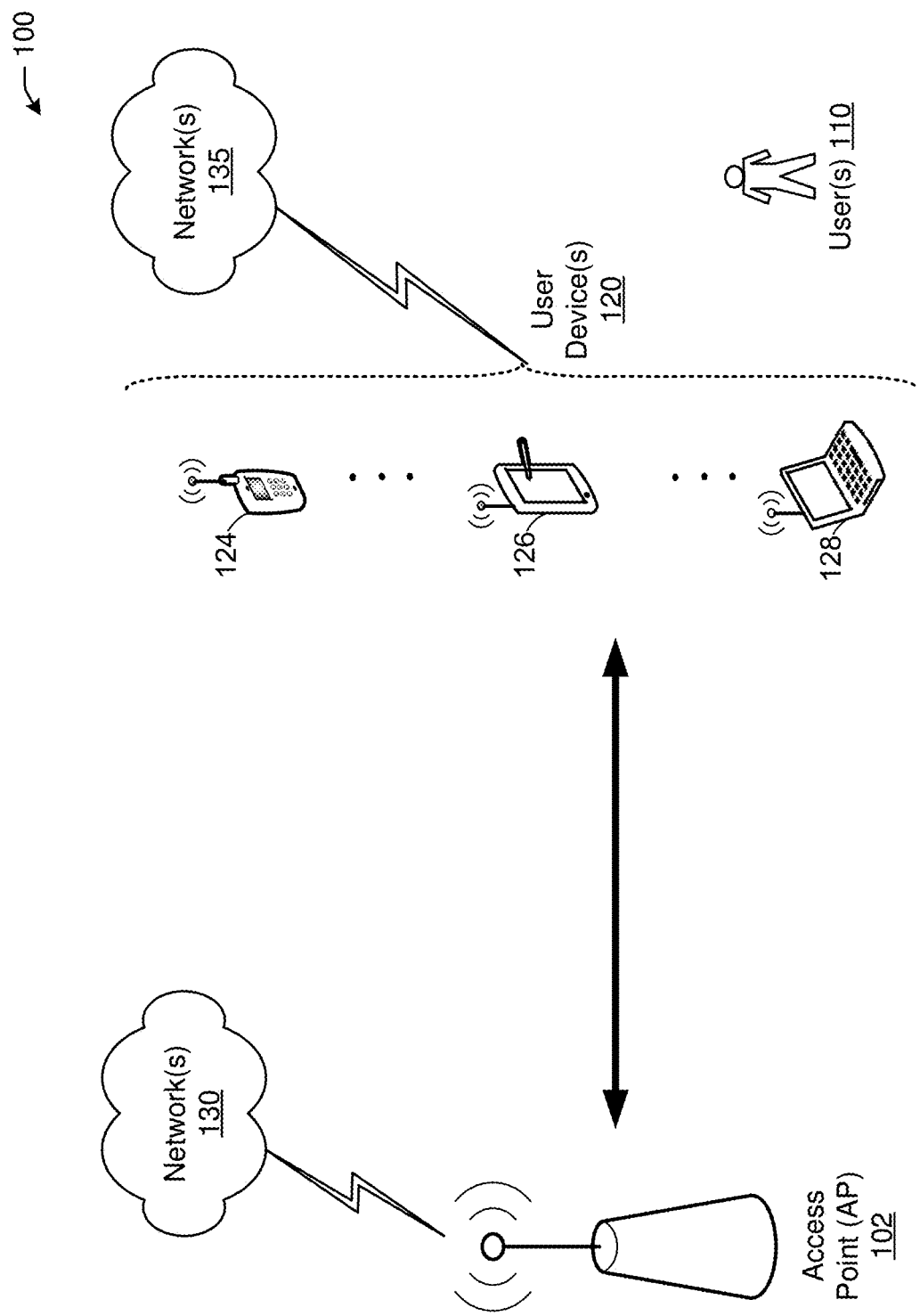
FIG. 1 depicts a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wireless communications using the IEEE 802.11 standards in a 5 GHz band, for example, may be limited due to constraints on maximum continuous air usage (e.g., transmission opportunity/channel occupancy time) in some geographic locations based on limitations imposed by the European Telecommunications Standards Institute (ETSI). A pause period may need to be embedded during a transmission opportunity (TXOP) period in order to comply with regulatory bodies (e.g., ETSI).

With regard to adaptability for load-based equipment, a device that initiates a sequence of one or more transmissions may be denoted as an initiating device. Otherwise, the device may be denoted as a responding device. The initiating device may implement a channel access mechanism with a prioritized, truncated exponential backoff mechanism. Each transmission may belong to a single channel occupancy time (COT). A COT may include one or more transmissions of an initiating device, and zero or more transmissions of one or more responding devices.

ETSI imposes that if a channel occupancy includes more than one transmission, the transmissions may need be separated by gaps (e.g., time gaps). The COT may be the total duration of all transmissions and all gaps of 25 µs duration or less within a channel occupancy, and may not exceed a maximum COT. In any case, the duration from the start of the first transmission within a channel occupancy until the end of the last transmission in that same channel occupancy may not exceed 20 milliseconds (ms).

According to ETSI, in order to increase the COT/TXOP, at least one pause period of 100 µs or more may need to be applied during transmissions. The purpose is to allow other devices in the network (or neighboring networks, or devices using other, non-IEEE802.11 technologies) to have potential access to the medium in order to transmit their own data.

Example embodiments described herein provide certain systems, methods, and devices for enhanced channel access, including, but not limited to, the IEEE 802.11 family of standards.

In one or more embodiments, COT limitations may be similar to TXOP limitations defined in the IEEE 802.11 standards, but there may be an ability for the initiating device (e.g., a TXOP holder) to insert one or more pauses into the TXOP. A pause is implemented for a TXOP holder to forego transmissions during the pause period of time (gap) and allow another device, for example, a responding device, to control the channel if needed during that pause period.

In one or more embodiments, a responding device may proceed with transmissions without performing a clear channel assessment (CCA) if the transmissions are initiated at most 16 µs after the last transmission by an initiating device that issued the grant.

In one or more embodiments, a responding device that does not proceed with transmissions within 16 µs after the last transmission from an initiating device that issued the grant, may perform a CCA on an operating channel during a single observation slot within a 25 µs period ending immediately before a granted transmission time.

In one or more embodiments, in order to increase a COT/TXOP, a pause period of 100 µs or more may need to be applied. By inserting at least one pause, a maximum COT (e.g., TXOP) duration may be extended from 6 to 8 ms for two access categories. In order to be able to re-access the medium at the end of the pause, an initiating device or a responding devices (e.g., a TXOP holder or a responder) may not need to perform a full listen before talk (LBT) procedure (e.g., with a backoff decrement), but the devices may check the CCA for a duration of a slot (e.g., 9 µs) during the 25 µs that precedes the end of the pause.

In one or more embodiments, a maximum airtime usage (e.g., a COT/TXOP) may be reduced from unlimited time for some scenarios, or 10 ms for some scenarios, to a value of 2-6 ms. A reduced value may limit 802.11-based devices in particular when operating in a multi-user (MU) mode, where long channel sounding/training (e.g., overhead) may need to be performed in the same TXOP (e.g., at the beginning) used for data transmission. An efficiency ratio between overhead and useful data may depend on the TXOP duration.

In one or more embodiments, an extension of the COT/TXOP may be executed by implementing one or more pause period(s). The TXOP may be a continuous transmission with gaps of short interframe space (SIFS) between consecutive physical layer (PHY) protocol data units (PPDUs). When the transmission gap is greater than the SIFS, other stations (STAs) may take control of the air, and the original TXOP holder may not continue transmitting.

In one or more embodiments, to optimize IEEE 802.11 operation to benefit from COT/TXOPs greater than 6 ms, a new mechanism may be defined.

In one or more embodiments, devices, systems, and methods may be introduced for maximizing the COT/TXOP for IEEE 802.11 devices using the COT/TXOP pause periods. For example, several load-based equipment operation methodologies may be used for non-contiguous TXOP operations when the TXOP contains at least one pause period where gaps are greater than the SIFS. The operation methodologies may align an enhanced distributed channel access (EDCA)/air access procedure during pause periods with new restrictions.

The EDCA) is an extension of an enhanced version of the distributed control function (DCF) defined in the original 802.11 media access control (MAC). The enhanced part is that the EDCA will define eight levels of access priority for the shared wireless channel. Like the original distributed coordination function (DCF), the EDCA is a contention-based protocol that employs a set of waiting intervals and backoff timers designed to avoid collisions. With the EDCA, each of the different access priorities is assigned a different range of waiting intervals and backoff counters. Transmissions with higher access priority are assigned shorter intervals.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 depicts a network diagram illustrating an example network environment, according to some example embodiments of the present disclosure. Wireless network 100 may include one or more user device(s) 120 and one or more responding device(s) (e.g., access point (AP) 102), which may communicate in accordance with IEEE 802.11 communication standards. The user device(s) 120 may be mobile devices that are non-stationary (e.g., not having fixed locations) or may be stationary devices.

Figure 6:
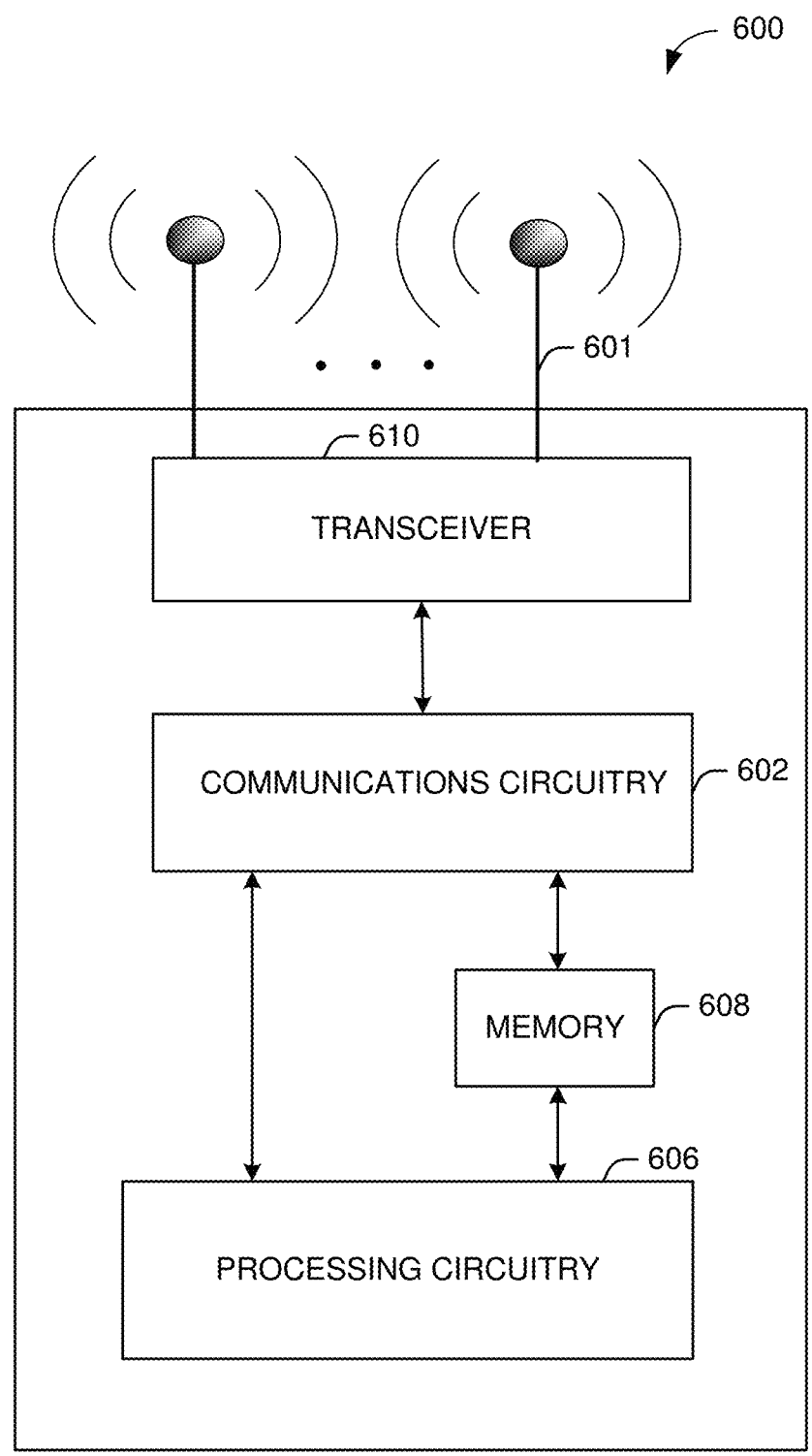
FIG. 6 depicts a functional diagram of an example communication station that may be suitable for use as a user device, in accordance with one or more example embodiments of the present disclosure.
Figure 7:
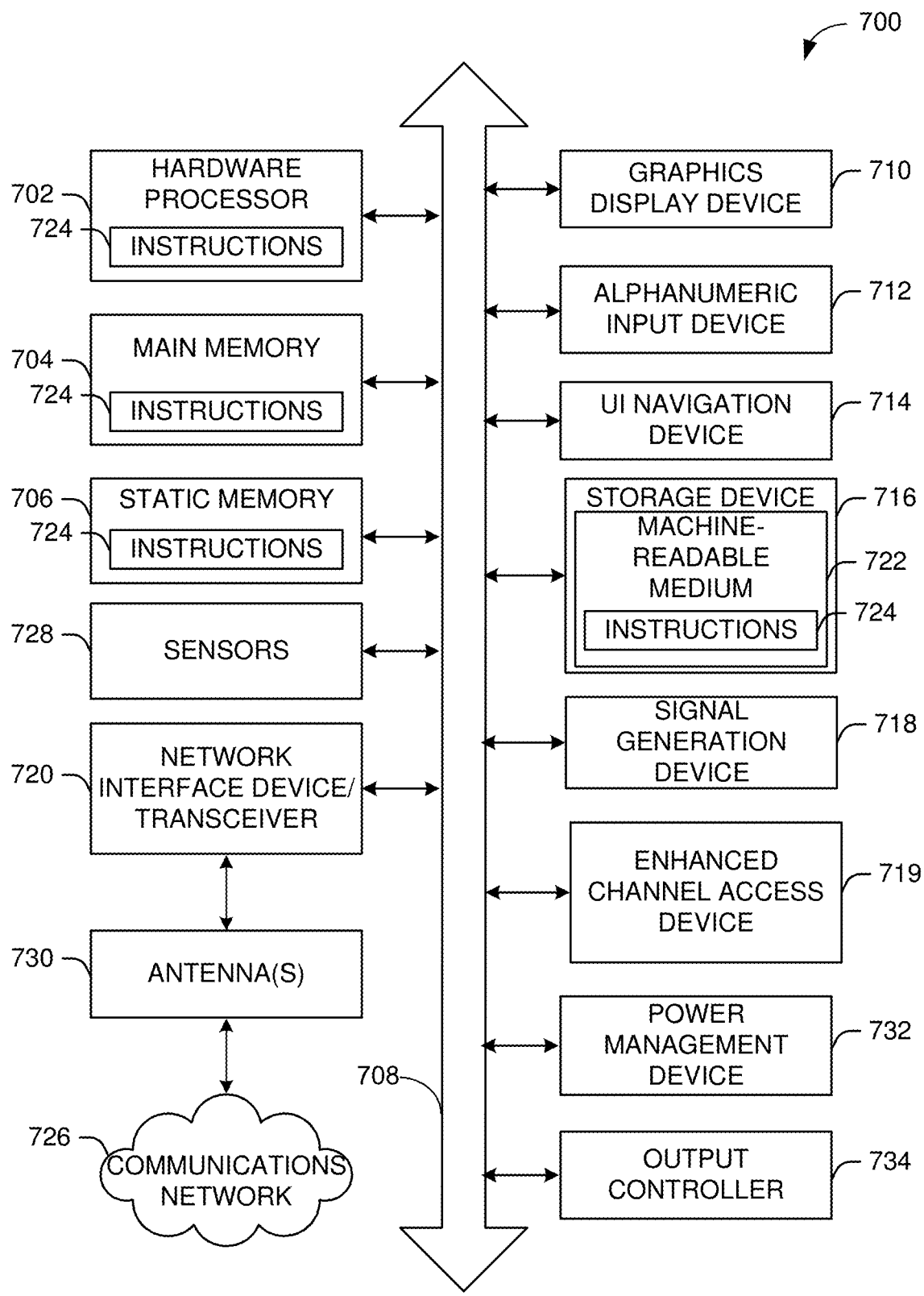
FIG. 7 depicts a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128) and AP(s) 102 may be configured to perform directional transmission and/or directional reception in conjunction with wirelessly communicating in a wireless network. Any of the user device(s) 120 (e.g., user devices 124, 126, 128) and AP(s) 102 may be configured to perform such directional transmission and/or reception using a set of multiple antenna arrays (e.g., directional multi-gigabit (DMG) antenna arrays or the like). Each of the multiple antenna arrays may be used for transmission and/or reception in a particular respective direction or range of directions. Any of the user device(s) 120 (e.g., user devices 124, 126, 128) and AP(s) 102 may be configured to perform any given directional transmission towards one or more defined transmit sectors. Any of the user device(s) 120 (e.g., user devices 124, 126, 128) and AP(s) 102 may be configured to perform any given directional reception from one or more defined receive sectors.

Multiple-input multiple-output (MIMO) beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128) and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

When an AP (e.g., AP 102) establishes communication with one or more user device(s) 120 (e.g., user devices 124, 126, and/or 128), the AP 102 may communicate in a downlink direction and the user device(s) 120 may communicate with the AP 102 in an uplink direction by sending frames in either direction. The user device(s) 120 may also communicate peer-to-peer or directly with each other with or without the AP 102. The frames may be preceded by one or more preambles that may be part of one or more headers. These preambles may be used to allow a device (e.g., the AP 102 and/or user devices 120) to detect a new incoming data frame from another device. A preamble may be a signal used in network communications to synchronize transmission timing between two or more devices (e.g., between the APs and user devices).

The IEEE 802.11 standard defines various frame types that devices may use for communications as well as managing and controlling the wireless link. These frame types may include data frames or signaling frames. The signaling frames may be divided into control frames and management frames. Management frames enable devices to establish and maintain communications. Some examples of management frames may include, but are not limited to, a fine timing measurement frame, an authentication frame, an association request frame, an association response frame, a beacon frame, etc. Control frames may assist in the delivery of data frames between devices. Some examples of control frames may include, but are not limited to, a request to send frame, a clear to send frame, acknowledgment frame, etc.

Typically, control frames have limited and simpler structures than management frames. This means that baseband processing may process control frames using a simpler procedure, resulting in faster processing. However, control frames are less flexible than management frames.

Any of the user device(s) 120 (e.g., user devices 124, 126, 128) and AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In one embodiment, and with reference to FIG. 1, when an AP (e.g., AP(s) 102) establishes communication with one or more user device(s) 120 (e.g., user devices 124, 126, and/or 128), the AP 102 may communicate in a downlink direction and the user device(s) 120 may communicate with the AP 102 in an uplink direction by sending frames in either direction. Data frames sent between the AP(s) 102 and the user device(s) 120 may be preceded by one or more preambles that may be part of one or more headers. These preambles may be used to allow a device (e.g., AP(s) 102 and/or user device(s) 120) to detect a new incoming data frame from another device. For example, the AP 102 may be an initiating device that may require access to a channel. The AP 102 may perform EDCA to gain access to the channel. The AP 102 may acquire the channel in a TXOP period in compliance with the COT rules. The COT rules may be that an initiating device has access to a channel for a period of time (e.g., 6 ms) then pause for another period of time (e.g., 100 µs), then re-access the channel for a short period of time (e.g., 2 ms).

It is understood that the above descriptions are for purposes of illustration and are not meant to be limiting.

Figure 2:
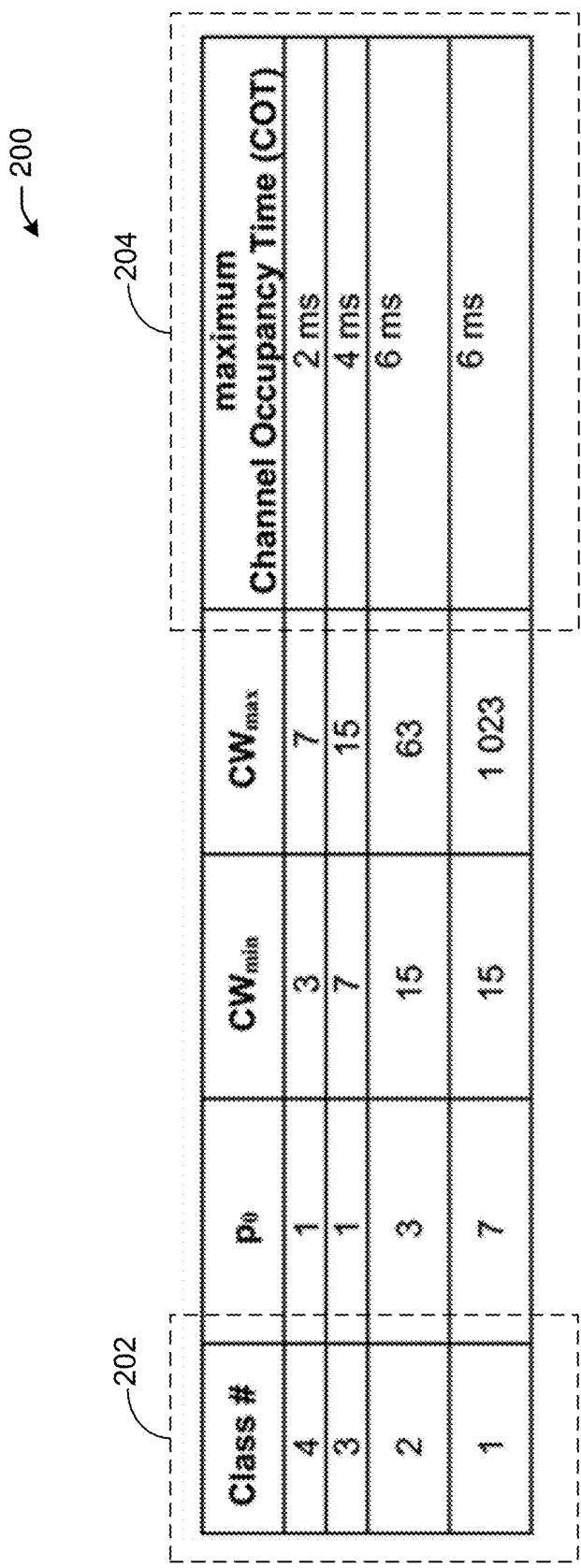
FIG. 2 shows a table representing channel access parameters, in accordance with one or more example embodiments of the present disclosure.

FIG. 2 shows a table 200 representing channel access parameters, in accordance with one or more example embodiments of the present disclosure.

Referring to FIG. 2, there is shown, based on ETSI, a table of priority classes 202 and the correlated channel occupancy time (COT) values 204. For example, an initiating device may have data to be transmitted in different priority classes (e.g., voice, video, text, etc.). Based on these different priority classes, a maximum COT value for channel access is correlated to each of the classes 202. That is, the table 200 may show a priority class dependent on channel access parameters for supervising devices.

In one or more embodiments, a maximum COT of 6 ms of the maximum COT values 204 may be increased to 8 ms by inserting one or more pauses. The minimum duration of a pause may be 100 µs. The maximum duration (e.g., channel occupancy) before including any such pause may be 6 ms. Pause duration may not be included in a COT. That is, after 6 ms of channel occupancy time, an initiating device must pause for 100 µs. During that pause, the initiating device forgoes access to the channel. After the pause, the initiating device may attempt to regain access to the channel.

In one or more embodiments, a maximum COT of 6 ms may be increased to 10 ms by extending a contention window (CW) to CW×2+1 when selecting a random number q for any backoff(s) that may precede a channel occupancy that may exceed 6 ms, or which follow a channel occupancy that exceeded 6 ms. A choice between preceding or following a channel occupancy may remain unchanged during an operation time of a device.

In one or more embodiments, a responding device may proceed with transmissions without performing a clear channel assessment (CCA) if the transmissions are initiated at most 16 µs after the last transmission by an initiating device that issued the grant.

In one or more embodiments, a responding device that does not proceed with transmissions within 16 µs after the last transmission from an initiating device that issued the grant, may perform a CCA on an operating channel during a single observation slot within a 25 µs period ending immediately before a granted transmission time.

Figure 3:
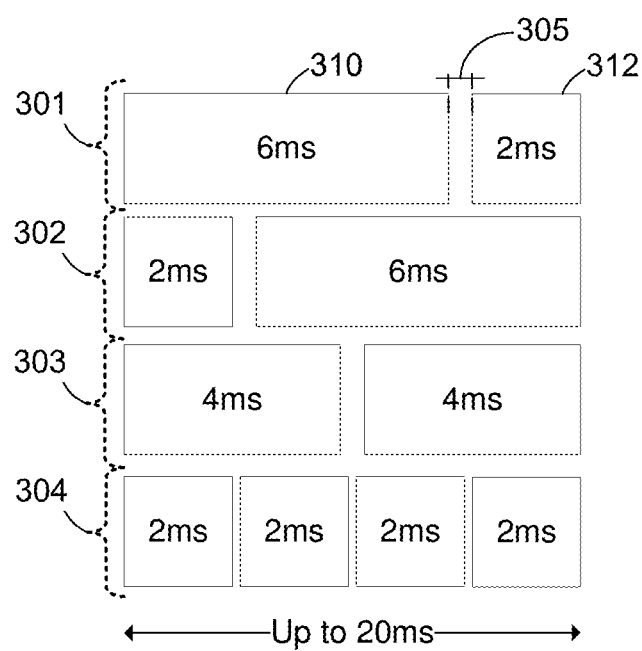
FIG. 3 depicts enhanced channel access timing, in accordance with one or more example embodiments of the present disclosure.

FIG. 3 depicts enhanced channel access timing 300, in accordance with one or more example embodiments of the present disclosure.

Various possibilities may be implemented to show the possible ways for utilizing the pause from the initiating device point of view for an 802.11 network. For example, scheme 301 shows that an initiating device may send a transmission 310 for a period of 6 ms (e.g., a TXOP), pause for a period of time 305 (e.g., 100 µs), then possibly send another transmission 312 for an additional 2 ms. Scheme 302 shows that a transmitting device may transmit for 2 ms, pause for 100 µs, then attempt to transmit again for an additional 6 ms. In scheme 303, an initiating device may transmit for 4 ms, pause for 100 µs, then attempt to transmit again for an additional 4 ms. Finally in scheme 304 of FIG. 3, an initiating device may transmit for 2 ms at a time with pauses in between, wherein the pauses may vary. The duration from the start of the first transmission within a channel occupancy until the end of the last transmission in that same channel occupancy may not exceed 20 milliseconds (ms).

In one or more embodiments, the network allocation vector (NAV) protection mechanisms may enable limiting IEEE 802.11 users to access air during pause periods (e.g., when sending a request to send (RTS) message). For example, the COT/TXOP initiator may continue regular operation up to the maximum COT/TXOP limit after conducting one pause of 100 µs. The initiator may protect the medium with the virtual clear channel assessment (CCA) mechanism (e.g., an NAV) for the entire duration that may comprise a basic TXOP (e.g., 6 ms), a pause (e.g., 100 µs), and an extra TXOP (e.g., 2 ms). Therefore, other third-party IEEE 802.11 STAs may not access the medium during the pause, and the TXOP initiator may re-access the medium without any blocking because the NAV was set. For example, the NAV may be set using the RTS message, or any other message capable of setting the NAV. The RTS message may be sent using a lower rate so that there is a higher likelihood that all STAs serviced by the AP can get the RTS message. Receiving the RTS message with a set NAV value allows the STAs to honor the NAV values such that they stay away from the medium (e.g., channel) for the duration of the NAV. The STAs that received the RTS and respond with a CTS frame may also carry the NAV value in the CTS frame. This also helps the STAs serviced by the AP to also know what the NAV is set to and stay away from the medium for the duration of the NAV. Typically, RTS/CTS are used at the beginning of the TXOP, which results in a mechanism to get protection for the entire TXOP. It should be understood that the RTS is one example of a frame having a set NAV value and that as long as a frame is sent having an NAV value, the STAs that receive that frame will respect that NAV and stay away from the medium for the duration set in the NAV.

For example, an AP may set an NAV for 8.1 ms in a first incoming PPDU that the AP transmits once the AP gains access to the medium with a relevant EDCA class. After 2 to 6 ms from accessing the medium, the AP may pause for 100 µs, then may retransmit for 2 to 6 ms, without being blocked since the NAV was set for 8.1 ms, which should cover 2 to 6 ms including a pause (e.g., 100 µs). It is understood that the above descriptions are for purposes of illustration and are not meant to be limiting.

In one or more embodiments, overlapping basic service set (OBSS) coordination methods may enable coordination between OBSSs to allow devices to access a medium during pauses. For example, the COT/TXOP initiator may indicate to other OBSS STAs (e.g., STAs that are co-located in the same device or in other devices) when the initiator will perform a pause, and may provide the STAs with a means to access the medium during that pause (e.g., likely only during that pause duration). At the end of a pause, the initial TXOP initiator may re-access the medium. For example, an AP may have a TXOP of 6 ms. After 6 ms, the AP may pause for 100 µs. Before the pause, the AP may send a signal to another AP to indicate that the AP may use the channel during the pause. The other AP may perform a backoff procedure ignoring the first AP's transmission, and may plan so that the backoff ends when the pause starts so that the other AP may preempt the channel (e.g., a single observation). The other AP may only reserve the channel for a time (e.g., 100 µs), and may then return the channel to the AP.

In one or more embodiments, methods for scheduled STA transmissions across a non-contiguous TXOP may exploit triggered access to schedule STA transmissions in a delayed time after a trigger (e.g., more than the SIFS) to enable scheduling of STAs before and after pauses. Uplink (UL) transmissions may be triggered using an SIFS time after the end of a trigger frame. The UL response may be requested, for example, to be sent 100 µs later so that a pause occurs. A responding STA may have to perform the CCA for one time slot during a previous time (e.g., 25 µs) and, if the channel is idle, the STA may transmit. If multiple STAs are scheduled, there may be a significant chance that at least one responding STA will transmit. After the AP transmits, the AP may be able to extend the TXOP (e.g., for another 2 ms). Therefore, the AP may receive a TXOP of, for example, 6 ms. And at the end of the TXOP, the AP may send a trigger to trigger multiple STAs for a short PPDU, and may request a response (e.g., a trigger-based PPDU) to be sent later (e.g., 100 µs later). After a time (e.g., 100 µs), scheduled STAs may transmit trigger-based PPDUs (e.g., after performing a CCA for one time slot among the last 25 µs), and may return the TXOP to the AP, which may use the TXOP for an additional time (e.g., 2 ms).

In one or more embodiments, one or more of the preceding methodologies may be combined, and may be transparent to an STA side.

In one or more embodiments, a COT/TXOP may include pause periods (e.g., gaps greater than the SIFS). For non-contiguous operation methodologies, the COT/TXOP initiator/holder may transmit or receive PPDUs during a first basic TXOP duration (e.g., <6 ms), then may perform at least a single pause period (e.g., >100 µs) and may re-access the medium at the end of this pause.

In one or more embodiments, a new trigger frame may be defined. The new trigger frame may be a delayed basic trigger, which may be similar to the basic trigger frame, but may also include a scheduled transmission time for the trigger-based PPDU.

In one or more embodiments, a new frame or a new element of a frame may be defined. A new control field (e.g., A-CTRL) may include time delay information, may be transmitted in the same PPDU as a trigger, and may apply to the trigger that is sent in the same PPDU. If an STA receives a trigger that schedules the STA for UL transmission, and if the new frame/element/control field is present in the same PPDU as the trigger, a target transmission time of the triggered UL transmissions may be defined as a time after the end of the PPDU that includes the trigger.

Figure 4:
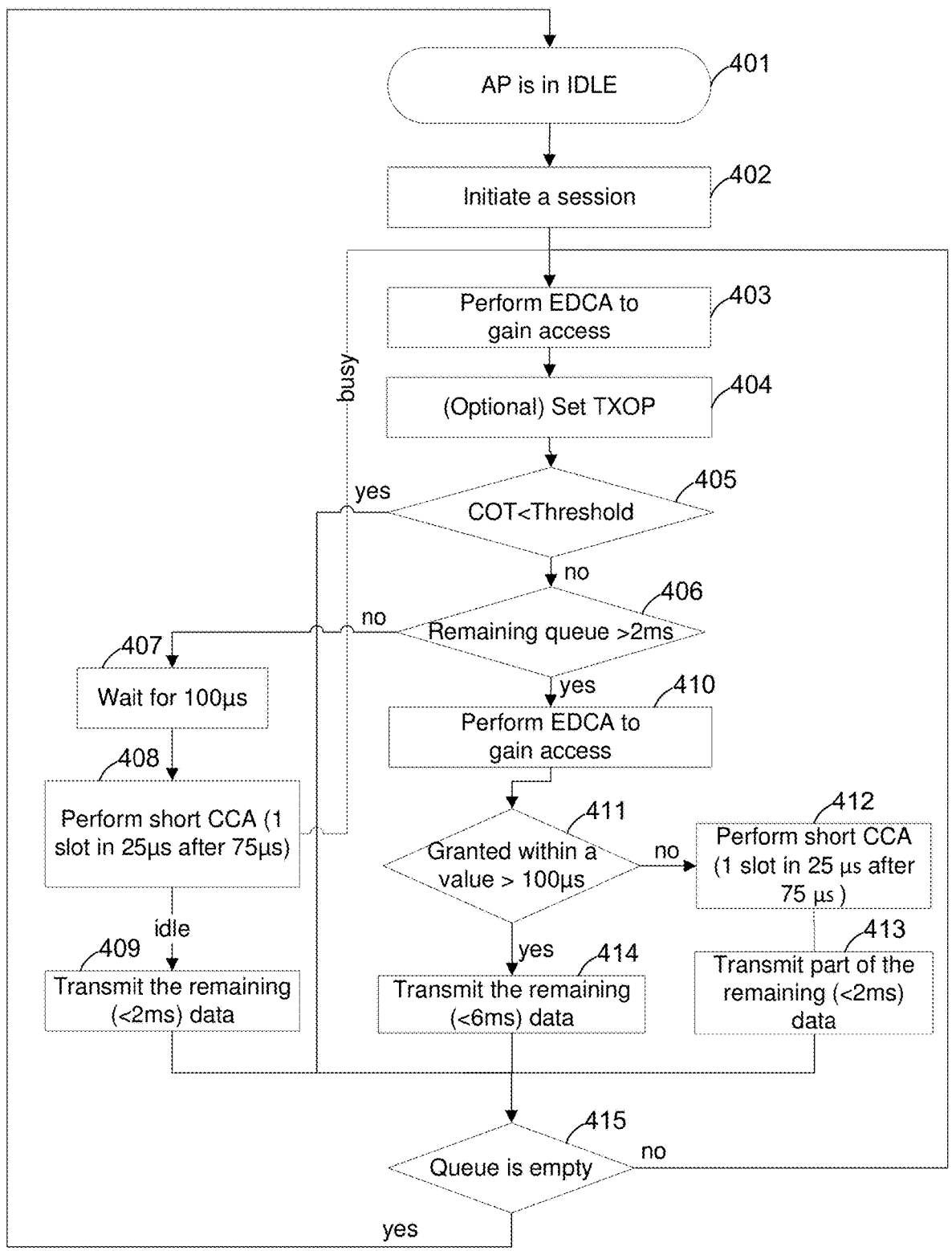
FIG. 4 depicts a flow diagram of an illustrative process for enhanced channel access, in accordance with one or more example embodiments of the present disclosure.

FIG. 4 depicts a flow diagram of an illustrative process 400 for enhanced channel access, in accordance with one or more example embodiments of the present disclosure.

In one or more embodiments, the process 400 may be valid only for a first priority class or a second priority class (e.g., priority class 1 or 2 of FIG. 2).

Referring to FIG. 4, there is shown an initiating device, in this case, an AP in a process of gaining access to a channel for data transmission to a responding device.

In one or more embodiments, parallel multiple channel access mechanisms may enable a controllable access category to access air during pause periods. For example, the COT/TXOP initiator may only protect the medium for a first duration before the pause (e.g., TXOP and NAV may be set to 6 ms). During the pause, the initiator may conduct a standard IEEE 802.11 EDCA backoff procedure to re-access the medium as soon as possible. There may be two options. First, if the EDCA backoff reaches zero before the end of the pause, an STA may access the medium and start a new TXOP of 6 or 8 ms, for example. Second, if the EDCA backoff does not reach zero before the end of a pause, the COT/TXOP initiator may perform channel access (e.g., short LBT) to attempt to access the medium for an extra time (e.g., 2 ms), unless a regulation does not mandate this, in which case the TXOP initiator may re-access the medium automatically without sensing the medium.

Referring back to FIG. 4, at block 401, the AP may be in an idle state.

At block 402, the AP may initiate a session in order to gain access to the channel for data transmission to the responding device. The AP may want to exploit the COT rules of setting a pause after a basic TXOP (e.g., 6 ms) in order to maximize the access to the medium even during the pause, while respecting the COT rules.

At block 403, the AP may perform EDCA to gain access to the channel.

At block 404, the AP may optionally set a TXOP if access to the channel is available.

At block 405, the AP may determine if the COT/TXOP is less than a threshold based, for example, on table 200 maximum COT values. For example the COT/TXOP may be 5 ms, which is less than the maximum COT of 6 ms for class 1. In that case, the difference may be determined.

At block 406, it is determined whether the remaining queue is greater than 2 ms. In the above example, the difference is 1 ms, therefore the process continues to block 407.

At block 407, the AP may pause for 100 μs as required by the COT rules.

At block 408, in order for the AP to regain access to the medium, the AP may be required to perform a short CCA in order to transmit its data.

At block 409, the AP may transmit its data but it may only have less than 2 ms to do so. That is it can only transmit data for a period of time that is less than 2 ms.

At block 410, if it was determined at block 406 that the remaining queue is greater than 2 ms, the AP may then perform EDCA to gain access to the medium again.

At block 411, the AP may determine whether access to the media was granted within a value greater than 100 μs.

At block 412, if the access to the medium was granted at less than 100 μs then the AP may perform a short CCA in order to have access to the medium.

At block 413, the AP may then transmit its remaining data, which should be less than 2 ms of medium access time since the AP already had an original TXOP to transmit its data.

At block 414, if the AP determines that the access to the medium was granted within a time period greater than 100 μs, the AP may then have to gain access to the channel and get a new or original TXOP of 6 ms. Therefore, the AP will have about 6 ms to transmit its remaining data.

At block 415, after the AP finishes the transmission of its data within the limitations of the COT rules, the AP may check its queue to determine whether it still has additional data to be sent. The process may start again if the AP has additional data to be transmitted.

For example, after 5.9-6 ms, an STA may pause for 100 μs, then the STA may redraw a backoff and may perform CCA and backoff procedures. After 100 μs, if a backoff procedure reaches zero, the STA may create a new TXOP (e.g., 6 ms). If the backoff procedure does not reach zero during the pause, the STA may perform a CCA check on a single slot for the remaining time (e.g., 25 μs) and, if idle, may extend the TXOP (e.g., by 2 ms). Based on this solution, a NAV may be set to 6 ms, because an STA may not be allowed to perform a backoff procedure before the NAV, which was set by the STA's previous PPDUs. Therefore, there may be a risk that the channel is taken during a pause. It is understood that the above descriptions are for purposes of illustration and are not meant to be limiting.

Figure 5:
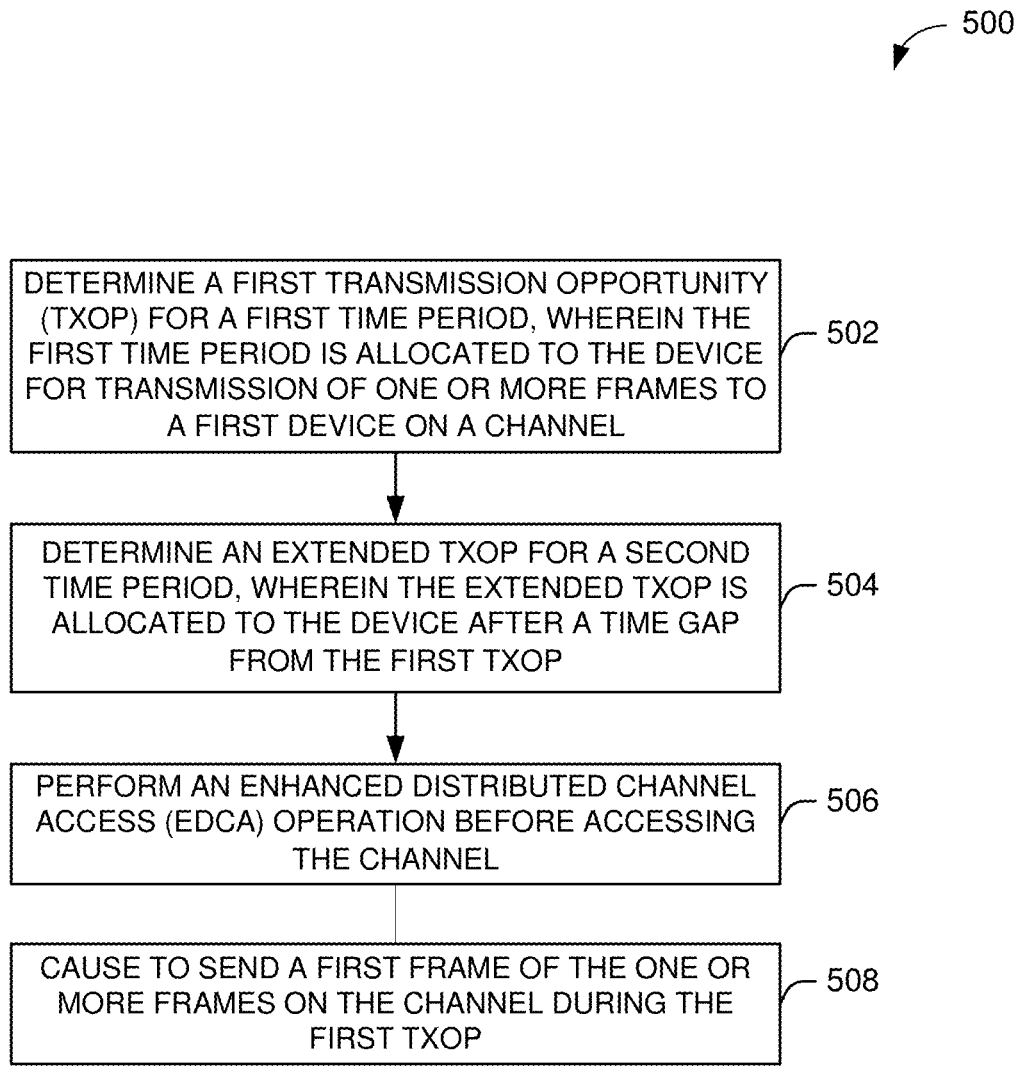
FIG. 5 illustrates a flow diagram of an illustrative process for enhanced channel access, in accordance with one or more example embodiments of the present disclosure.

FIG. 5 illustrates a flow diagram of an illustrative process 500 for enhanced channel access, in accordance with one or more example embodiments of the present disclosure.

At block 502, a device (e.g., the user device(s) 120 and/or the AP 102 of FIG. 1) may determine a first transmission opportunity (TXOP) for a first time period, wherein the first time period is allocated to the device for transmission of one or more frames to a first device on a channel.

At block 504, the device may determine an extended TXOP for a second time period, wherein the extended TXOP is allocated to the device after a time gap from the first TXOP.

At block 506, the device may perform an enhanced distributed channel access (EDCA) operation before accessing the channel.

At block 508, the device may cause to send a first frame of the one or more frames on the channel during the first TXOP.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communication circuitry 602). The communications circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2, 3, 4, and 5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), enhanced channel access device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The enhanced channel access device 719 may be configured to perform the operations detailed in FIGS. 2, 3, 4, and 5. It is understood that the above are only a subset of what the enhanced channel access device 719 may be configured to perform and that other functions included throughout this disclosure may also be performed by the enhanced channel access device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a first transmission opportunity (TXOP) for a first time period, wherein the first time period may be allocated to the device for transmission of one or more frames to a first device on a channel; determine an extended TXOP for a second time period, wherein the extended TXOP may be allocated to the device after a time gap from the first TXOP; perform an enhanced distributed channel access (EDCA) operation before accessing the channel; and cause to send a first frame of the one or more frames on the channel during the first TXOP.

Example 2 may include the device of example 1 and/or some other example herein, wherein the first time period may be a maximum allowed time period.

Example 3 may include the device of example 1 and/or some other example herein, wherein the device may not transmit any frames during the time gap.

Example 4 may include the device of example 1 and/or some other example herein, wherein the processing circuitry may be further configured to: determine remaining frames from the one or more frames to be transmitted; determine a remaining time from the first TXOP; and determine to perform a short clear channel assessment (CCA) based on the remaining time.

Example 5 may include the device of example 1 and/or some other example herein, wherein the processing circuitry may be further configured to: determine remaining frames from the one or more frames to be transmitted; determine a remaining time from the first TXOP after sending the first frame; determine the remaining time may be less than two milliseconds; and cause to pause transmissions for the duration of the time gap.

Example 6 may include the device of example 1 and/or some other example herein, wherein the processing circuitry may be further configured to: determine remaining frames from the one or more frames to be transmitted; determine a remaining time from the first TXOP after sending the first frame; determine the remaining time may be greater than or equal to two milliseconds; and perform the EDCA operation before accessing the channel.

Example 7 may include the device of example 6 and/or some other example herein, wherein the processing circuitry may be further configured to: determine channel access may be granted within a time value greater than 100 μs; and perform a short clear channel assessment (CCA).

Example 8 may include the device of example 6 and/or some other example herein, wherein the processing circuitry may be further configured to: determine channel access may be granted within a time value of less than 100 μs; and cause to send a second frame of the one or more frames on the channel during the extended TXOP.

Example 9 may include the device of example 6 and/or some other example herein, wherein the processing circuitry may be further configured to: set a network allocation vector (NAV) value to be greater than or equal to the first time period, the extended TXOP, and the time gap; and cause to send a third frame including the NAV value to the first device on the channel.

Example 10 may include the device of example 6 and/or some other example herein, wherein the third frame may be a request to send (RTS) frame.

Example 11 may include a non-transitory computer-readable medium storing computer-executable instructions which when executed by one or more processors result in performing operations comprising: determining a first transmission opportunity (TXOP) for a first time period, wherein the first time period may be allocated to the device for transmission of one or more frames to a first device on a channel; determining an extended TXOP for a second time period, wherein the extended TXOP may be allocated to the device after a time gap from the first TXOP; performing an enhanced distributed channel access (EDCA) operation before accessing the channel; and causing to send a first frame of the one or more frames on the channel during the first TXOP.

Example 12 may include the non-transitory computer-readable medium of example 1 and/or some other example herein, wherein the first time period may be a maximum allowed time period.

Example 13 may include the non-transitory computer-readable medium of example 1 and/or some other example herein, wherein the device may not transmit any frames during the time gap.

Example 14 may include the non-transitory computer-readable medium of example 1 and/or some other example herein, wherein the operations further comprise: determining remaining frames from the one or more frames to be transmitted; determining a remaining time from the first TXOP; and determining to perform a short clear channel assessment (CCA) based on the remaining time.

Example 15 may include the non-transitory computer-readable medium of example 1 and/or some other example herein, wherein the operations further comprise: determining remaining frames from the one or more frames to be transmitted; determining a remaining time from the first TXOP after sending the first frame; determining the remaining time may be less than two milliseconds; and causing to pause transmissions for the duration of the time gap.

Example 16 may include the non-transitory computer-readable medium of example 1 and/or some other example herein, wherein the operations further comprise: determining remaining frames from the one or more frames to be transmitted; determining a remaining time from the first TXOP after sending the first frame; determining the remaining time may be greater than or equal to two milliseconds; and performing the EDCA operation before accessing the channel.

Example 17 may include the non-transitory computer-readable medium of example 6 and/or some other example herein, wherein the operations further comprise: determining channel access may be granted within a time value greater than 100 µs; and performing a short clear channel assessment (CCA).

Example 18 may include the non-transitory computer-readable medium of example 6 and/or some other example herein, wherein the operations further comprise: determining channel access may be granted within a time value of less than 100 µs; and causing to send a second frame of the one or more frames on the channel during the extended TXOP.

Example 19 may include the non-transitory computer-readable medium of example 6 and/or some other example herein, wherein the operations further comprise: set a network allocation vector (NAV) value to be greater than or equal to the first time period, the extended TXOP, and the time gap; and cause to send a third frame including the NAV value to the first device on the channel.

Example 20 may include the non-transitory computer-readable medium of example 6 and/or some other example herein, wherein the third frame may be a request to send (RTS) frame.

Example 21 may include a method comprising: determine a first transmission opportunity (TXOP) for a first time period, wherein the first time period may be allocated to the device for transmission of one or more frames to a first device on a channel; determine an extended TXOP for a second time period, wherein the extended TXOP may be allocated to the device after a time gap from the first TXOP; perform an enhanced distributed channel access (EDCA) operation before accessing the channel; and cause to send a first frame of the one or more frames on the channel during the first TXOP.

Example 22 may include the method of example 1 and/or some other example herein, wherein the first time period may be a maximum allowed time period.

Example 23 may include the method of example 1 and/or some other example herein, wherein the device may not transmit any frames during the time gap.

Example 24 may include the method of example 1 and/or some other example herein, further comprising: determine remaining frames from the one or more frames to be transmitted; determine a remaining time from the first TXOP; and determine to perform a short clear channel assessment (CCA) based on the remaining time.

Example 25 may include the method of example 1 and/or some other example herein, further comprising: determine remaining frames from the one or more frames to be transmitted; determine a remaining time from the first TXOP after sending the first frame; determine the remaining time may be less than two milliseconds; and cause to pause transmissions for the duration of the time gap.

Example 26 may include the method of example 1 and/or some other example herein, further comprising: determine remaining frames from the one or more frames to be transmitted; determine a remaining time from the first TXOP after sending the first frame; determine the remaining time may be greater than or equal to two milliseconds; and perform the EDCA operation before accessing the channel.

Example 27 may include the method of example 6 and/or some other example herein, further comprising: determine channel access may be granted within a time value greater than 100 µs; and perform a short clear channel assessment (CCA).

Example 28 may include the method of example 6 and/or some other example herein, further comprising: determine channel access may be granted within a time value of less than 100 µs; and cause to send a second frame of the one or more frames on the channel during the extended TXOP.

Example 29 may include the method of example 6 and/or some other example herein, further comprising: set a network allocation vector (NAV) value to be greater than or equal to the first time period, the extended TXOP, and the time gap; and cause to send a third frame including the NAV value to the first device on the channel.

Example 30 may include the method of example 6 and/or some other example herein, wherein the third frame may be a request to send (RTS) frame.

Example 31 may include an apparatus comprising means for: determine a first transmission opportunity (TXOP) for a first time period, wherein the first time period may be allocated to the device for transmission of one or more frames to a first device on a channel; determine an extended TXOP for a second time period, wherein the extended TXOP may be allocated to the device after a time gap from the first TXOP; perform an enhanced distributed channel access (EDCA) operation before accessing the channel; and cause to send a first frame of the one or more frames on the channel during the first TXOP.

Example 32 may include the apparatus of example 1 and/or some other example herein, wherein the first time period may be a maximum allowed time period.

Example 33 may include the apparatus of example 1 and/or some other example herein, wherein the device may not transmit any frames during the time gap.

Example 34 may include the apparatus of example 1 and/or some other example herein, further comprising: determine remaining frames from the one or more frames to be transmitted; determine a remaining time from the first TXOP; and determine to perform a short clear channel assessment (CCA) based on the remaining time.

Example 35 may include the apparatus of example 1 and/or some other example herein, further comprising: determine remaining frames from the one or more frames to be transmitted; determine a remaining time from the first TXOP after sending the first frame; determine the remaining time may be less than two milliseconds; and cause to pause transmissions for the duration of the time gap.

Example 36 may include the apparatus of example 1 and/or some other example herein, further comprising: determine remaining frames from the one or more frames to be transmitted; determine a remaining time from the first TXOP after sending the first frame; determine the remaining time may be greater than or equal to two milliseconds; and perform the EDCA operation before accessing the channel.

Example 37 may include the apparatus of example 6 and/or some other example herein, further comprising: determine channel access may be granted within a time value greater than 100 µs; and perform a short clear channel assessment (CCA).

Example 38 may include the apparatus of example 6 and/or some other example herein, further comprising: determine channel access may be granted within a time value of less than 100 µs; and cause to send a second frame of the one or more frames on the channel during the extended TXOP.

Example 39 may include the apparatus of example 6 and/or some other example herein, further comprising: set a network allocation vector (NAV) value to be greater than or equal to the first time period, the extended TXOP, and the time gap; and cause to send a third frame including the NAV value to the first device on the channel.

Example 40 may include the apparatus of example 6 and/or some other example herein, wherein the third frame may be a request to send (RTS) frame.

Example 41 may include one or more non-transitory computer-readable media comprising instructions to cause an electronic device, upon execution of the instructions by one or more processors of the electronic device, to perform one or more elements of a method described in or related to any of examples 1-40, or any other method or process described herein.

Example 42 may include an apparatus comprising logic, modules, and/or circuitry to perform one or more elements of a method described in or related to any of examples 1-40, or any other method or process described herein.

Example 43 may include a method, technique, or process as described in or related to any of examples 1-40, or portions or parts thereof.

Example 44 may include an apparatus comprising: one or more processors and one or more computer readable media comprising instructions that, when executed by the one or more processors, cause the one or more processors to perform the method, techniques, or process as described in or related to any of examples 1-40, or portions thereof.

Example 45 may include a method of communicating in a wireless network as shown and described herein.

Example 46 may include a system for providing wireless communication as shown and described herein.

Example 47 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine a first transmission opportunity (TXOP) for a first time period, wherein the first time period is allocated to the device for transmission of one or more frames to a first device on a channel;
   determine an extended TXOP for a second time period, wherein the extended TXOP is allocated to the device after a time gap from the first TXOP, wherein the time gap introduces a pause between the first TXOP and the extended TXOP;
   perform an enhanced distributed channel access (EDCA) operation before accessing the channel; and
   cause to send a first frame of the one or more frames on the channel during the first TXOP.

2. The device of claim 1, wherein the first time period is a maximum allowed time period.

3. The device of claim 1, wherein the device may not transmit any frames during the time gap.

4. The device of claim 1, wherein the processing circuitry is further configured to:
   determine remaining frames from the one or more frames to be transmitted;
   determine a remaining time from the first TXOP; and
   determine to perform a short clear channel assessment (CCA) based on the remaining time.

5. The device of claim 1, wherein the processing circuitry is further configured to:
   determine the remaining frames from the one or more frames to be transmitted;
   determine a remaining time from the first TXOP after sending the first frame;
   determine the remaining time is less than two milliseconds; and
   cause to pause transmissions for the duration of the time gap.

6. The device of claim 1, wherein the processing circuitry is further configured to:
   determine the remaining frames from the one or more frames to be transmitted;
   determine a remaining time from the first TXOP after sending the first frame;
   determine the remaining time is greater than or equal to two milliseconds; and
   perform the EDCA operation before accessing the channel.

7. The device of claim 6, wherein the processing circuitry is further configured to:
   determine channel access is granted within a time value greater than 100 μs; and
   perform a short clear channel assessment (CCA).

8. The device of claim 6, wherein the processing circuitry is further configured to:
   determine channel access is granted within a time value of less than 100 μs; and
   cause to send a second frame of the one or more frames on the channel during the extended TXOP.

9. The device of claim 1, wherein the processing circuitry is further configured to:
   set a network allocation vector (NAV) value to be greater than or equal to the first time period, the extended TXOP, and the time gap; and
   cause to send a third frame including the NAV value to the first device on the channel.

10. The device of claim 1, wherein the third frame is a request to send (RTS) frame.

11. The device of claim 1, further comprising a transceiver configured to transmit and receive wireless signals.

12. The device of claim 11, further comprising an antenna coupled to the transceiver.

13. A non-transitory computer-readable medium storing computer-executable instructions which when executed by one or more processors result in performing operations comprising:
   determining a first transmission opportunity (TXOP) for a first time period, wherein the first time period is allocated to the device for transmission of one or more frames to a first device on a channel;
   determining an extended TXOP for a second time period, wherein the extended TXOP is allocated to the device after a time gap from the first TXOP, wherein the time gap introduces a pause between the first TXOP and the extended TXOP;
   performing an enhanced distributed channel access (EDCA) operation before accessing the channel; and causing to send a first frame of the one or more frames on the channel during the first TXOP.

14. The non-transitory computer-readable medium of claim 13, wherein the first time period is a maximum allowed time period.

15. The non-transitory computer-readable medium of claim 13, wherein the device may not transmit any frames during the time gap.

16. The non-transitory computer-readable medium of claim 13, wherein the operations further comprise:
    determining remaining frames from the one or more frames to be transmitted;
    determining a remaining time from the first TXOP; and
    determining to perform a short clear channel assessment (CCA) based on the remaining time.

17. The non-transitory computer-readable medium of claim 13, wherein the operations further comprise:
    determining the remaining frames from the one or more frames to be transmitted;
    determining a remaining time from the first TXOP after sending the first frame;
    determining the remaining time is less than two milliseconds; and
    causing to pause transmissions for the duration of the time gap.

18. The non-transitory computer-readable medium of claim 13, wherein the operations further comprise:
    setting a network allocation vector (NAV) value to be greater than or equal to the first time period, the extended TXOP, and the time gap; and
    causing to send a third frame including the NAV value to the first device on the channel.

19. The non-transitory computer-readable medium of claim 13, wherein the third frame is a request to send (RTS) frame.

20. A method comprising:
    determining, by one or more processors of a device, a first transmission opportunity (TXOP) for a first time period, wherein the first time period is allocated to the device for transmission of one or more frames to a first device on a channel;
    determining an extended TXOP for a second time period, wherein the extended TXOP is allocated to the device after a time gap from the first TXOP, wherein the time gap introduces a pause between the first TXOP and the extended TXOP;
    performing an enhanced distributed channel access (EDCA) operation before accessing the channel; and
    causing to send a first frame of the one or more frames on the channel during the first TXOP.

* * * * *